(No Model.)
G. WOODS.
PLUMB LEVEL FOR BORING BITS.
No. 371,294. Patented Oct. 11, 1887.
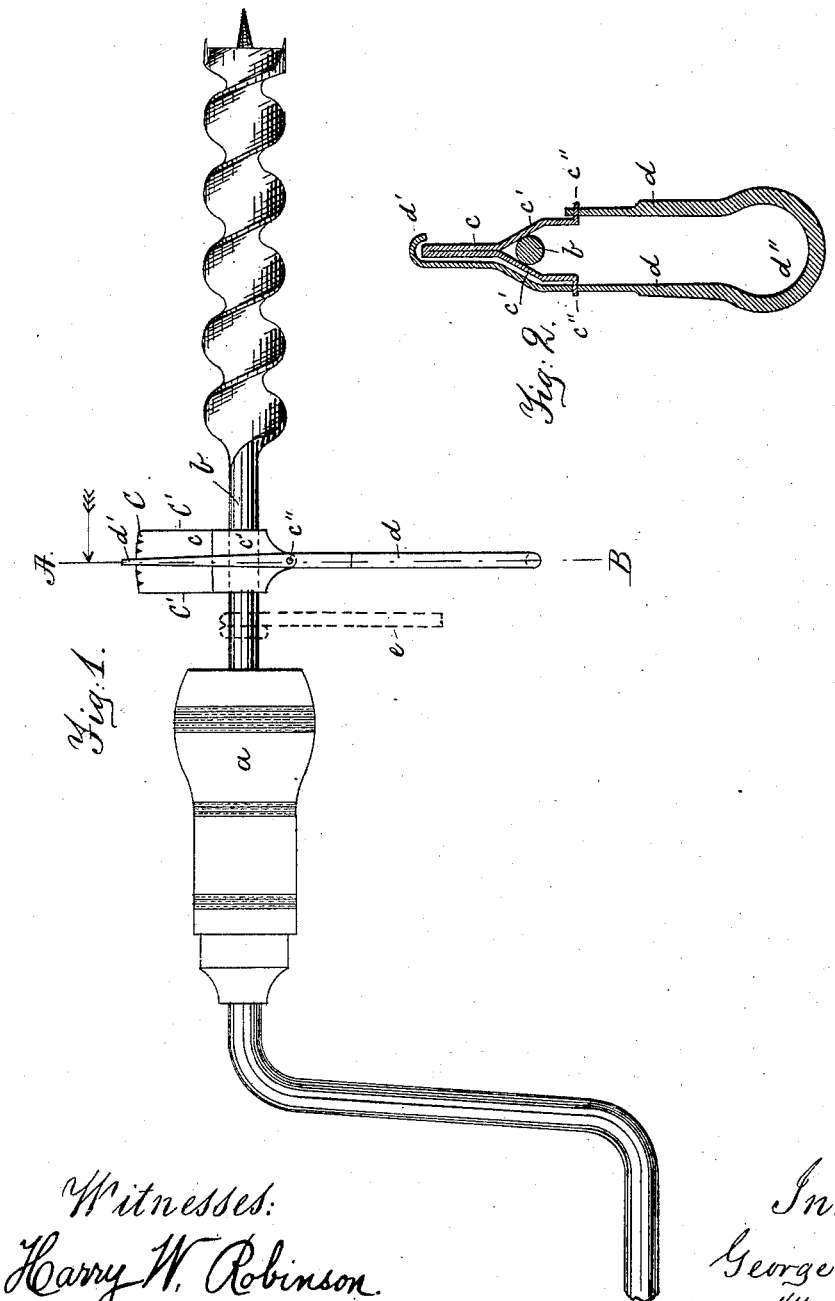

UNITED STATES PATENT OFFICE.

GEORGE WOODS, OF NEEDHAM, MASSACHUSETTS.

PLUMB-LEVEL FOR BORING-BITS.

SPECIFICATION forming part of Letters Patent No. 371,294, dated October 11, 1887.

Application filed January 26, 1887. Serial No. 225,598. (No model.)

*To all whom it may concern:*

Be it known that I, GEORGE WOODS, a citizen of the United States, and a resident of Needham, in the county of Norfolk and State of Massachusetts, have invented new and useful Improvements in Leveling Devices, of which the following, taken in connection with the accompanying drawings, is a specification.

Figure 1 represents a side elevation of the leveling device as applied to a bit in a bit-stock while boring holes in wood or other materials, and Fig. 2 represents a vertical section on the line A B, shown in Fig. 1.

Similar letters refer to similar parts wherever they occur on the different parts of the drawings.

The object of the invention is to make a sensitive and simple level to be adapted for use on boring-bits while the operator is in the act of boring holes, so as to ascertain the desired inclination or level in which the bit is used, and although the device is principally designed for use on boring-bits it is equally useful on planes, or for other purposes where a level is required.

$a$ in Fig. 1 represents a portion of an ordinary bit-stock, and $b$ represents a boring-bit as usually secured to the bit stock, as shown. Upon the shank of the bit $b$, I suspend loosely the metal plate or frame $c$, having V-shaped lower legs or sides, $c'$ $c'$, so as to enable the lever to be used on and to fit bit-shanks of various sizes. The lower ends of the legs $c'$ $c'$ terminate preferably as fulcrum-pins $c''$ $c''$, to which is hung the U-shaped pendulum, $d$, one side of which extends upward and above the frame $c$ in the form of an index-pointer, $d'$, as shown in the drawings, such pointer serving to indicate upon a scale, C, at the upper edge or side of frame $c$, the level or inclination in which the bit is being held. I prefer to make the lower portion of the pendulum $d$ with an enlarged open eye, $d''$, as shown in Fig. 2, to permit the end of the bit to be inserted through it when it is desired to locate the level on the bit-shank, as shown in Fig. 1; but this is not essential, as the said pendulum may be made wide enough between its legs to take in any desired size of bit.

The front and rear $c'$ $c'$ of the frame $c$ are made parallel and vertical, as shown in Fig. 1, so that the leveling device may be used as an ordinary level, simply by laying or holding the front or rear portions, $c'$, against the side of the object to be leveled, or to ascertain the particular level or inclination of any desired object.

In using the device on a boring-bit when boring horizontally or at a slight inclination to the horizontal plane, I suspend the device on the shank of the bit, as shown in the drawings, and during the operation of boring all the operator has to do is to look from above on the index C and pointer $d'$, and thus he is able to tell at a glance whether or not the bit is going in the desired direction—level or otherwise. It will readily be seen that by means of the scale C and pointer $d'$ on the suspended pendulum any desired degree of inclination can easily be read and the bit used accordingly.

If the bit is to be used in a vertical, or nearly so, direction, I attach in a suitable manner a wire or projection, $e$, on the shank of the boring-bit, which wire I arrange at a right angle to the bit-shank, as shown in dotted lines in Fig. 1, and on such projection or arm I suspend the frame $c$, precisely as above described, and as the bit is turned round its inclination or perpendicular position can easily be ascertained from time to time by holding the bit still a few moments and looking down on the scale and pointer, as previously described. A similar projection may also be attached to a planing tool, and by suspending the leveling device thereon, as above described, the inclination of the surface in process of being planed can easily be ascertained from time to time, and thus the desired inclination or level of the surface obtained without the need of using an additional level or try-square.

What I wish to secure by Letters Patent, and claim, is—

The leveling device, as described, consisting of the frame $c$, having downwardly-projecting V-shaped legs $c'$ $c'$, to which is pivoted the pendulum $d$, having upwardly-projecting pointer $d'$, adapted to indicate upon a scale, C, on the frame $c$, as and for the purpose set forth.

In testimony whereof I have signed my name to this specification, in the presence of two subscribing witnesses, on this 10th day of January, A. D. 1887.

GEORGE WOODS.

Witnesses:
ALBAN ANDRÉN,
HENRY CHADBOURN.